United States Patent
Imai

(10) Patent No.: US 7,583,407 B2
(45) Date of Patent: Sep. 1, 2009

(54) COLOR PROCESSING METHOD AND APPARATUS

(75) Inventor: Ayato Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 11/466,200

(22) Filed: Aug. 22, 2006

(65) Prior Publication Data
US 2007/0046960 A1 Mar. 1, 2007

(30) Foreign Application Priority Data
Aug. 23, 2005 (JP) ............... 2005-241562

(51) Int. Cl.
G03F 3/08 (2006.01)
H04N 1/46 (2006.01)
G06K 9/00 (2006.01)
G09G 5/02 (2006.01)

(52) U.S. Cl. .................. 358/1.9; 358/515; 358/518; 358/519; 358/520; 358/529; 358/3.28; 382/162; 382/167; 345/591; 345/604

(58) Field of Classification Search .................. 358/1.9, 358/515, 518, 3.28, 519, 520, 529; 382/162, 382/167; 345/591, 604
See application file for complete search history.

(56) References Cited

U.S. PATENT DOCUMENTS

| 6,178,008 B1 | 1/2001 | Bokman et al. |
| 2005/0052670 A1 | 3/2005 | Nishikawa |
| 2005/0052671 A1* | 3/2005 | Nishikawa ............ 358/1.9 |

FOREIGN PATENT DOCUMENTS

| EP | 735743 A2 | 10/1996 |
| EP | 1403334 A1 | 3/2004 |
| JP | 2001-136401 A | 5/2001 |
| JP | 2003-011432 A | 1/2003 |
| JP | 2005-059360 A | 3/2005 |

* cited by examiner

Primary Examiner—Edward L Coles
Assistant Examiner—Charlotte M Baker
(74) Attorney, Agent, or Firm—Canon U.S.A. Inc., I.P. Division

(57) ABSTRACT

In a high lightness region of a color hue corresponding to a basic color material, the high lightness region ranging from a lightness level corresponding to the maximum color saturation level that is reproducible by the basic color material to the highest lightness level, color separation data corresponding to the basic color material is generated. In an intermediate lightness region whose lightness level is lower than that of the high lightness region, color separation data corresponding to the basic color material and two color materials (one of them is preferably is a particular color material) that have color hues close to that of the basic color material is generated. This provides the advantage of enlarging the color gamut in the low lightness region of a basic color hue.

7 Claims, 6 Drawing Sheets

COLOR PROCESSING METHOD AND APPARATUS

BACKGROUND OF THE INVENTION

1. Field of the Invention

The present invention relates to a color processing method and apparatus.

2. Description of the Related Art

If a recording apparatus uses, for example, cyan (C), magenta (M), yellow (Y), and black (K) recording materials such as ink or toner, R, G, and B image data is color-separated into C, M, Y, and K data corresponding to the individual recording materials in image processing for generating print data. The color separation processing is typically performed using a lookup table (LUT). The LUT defines a method of generating C, M, Y, and K data by combining recording materials on the basis of the combination of R, G, and B data.

In the print industry where ink and toner are used, a particular color is sometimes used in a recording apparatus so as to enlarge the reproducible color gamut of the recording apparatus, that is, so as to accurately reproduce color saturation. In this case, in addition to the usually used cyan, magenta, and yellow (basic colors) and black color materials, red, orange, green, blue, and violet recording materials are also used.

Japanese Patent Laid-Open No. 2001-136401 discloses a color separation technique in which a color gamut is separated into color sub-gamuts each composed of black and three chromatic colors so as to extract the combination of the colors from each color sub-gamut. However, in this technique, the combination of colors is extracted from a color sub-gamut composed of four colors, therefore, it is limited to the combination of four or less colors and to the combination having been determined when the color sub-gamut was generated. Accordingly, appropriate color separation over the entire color gamut cannot be achieved. In addition, smooth gradation cannot be maintained at boundaries between color sub-gamuts.

In Japanese Patent Laid-Open No. 2003-011432, if the color saturation of a particular color used to represent a particular color hue becomes lower than that of the mixture of basic colors in a certain lightness region, color separation is performed using both the particular color and the basic colors. For example, if green ink having high lightness is used to represent a green hue, the color mixture of cyan and yellow is used in the low lightness region of the green hue so as to enlarge the color gamut. However, this method can enlarge the color gamut of a particular color hue, but cannot enlarge the color gamut of a basic color hue.

Japanese Patent Laid-Open No. 2005-059360 discloses a technique for enlarging a color gamut of a basic color hue by using a complementary color of a particular color in the low lightness region of the basic color hue. However, this technique focuses on just high lightness and high color saturation of a particular color. It is doubtful that a color gamut can be enlarged sufficiently by using the technique. In addition, the use of a complementary color of a particular color is undesirable from a granularity viewpoint.

SUMMARY OF THE INVENTION

The present invention provides a color processing method and apparatus capable of enlarging a reproducible color gamut by not only focusing on the high lightness and high color saturation of a particular color but also effectively using the spectral characteristics of a color material.

According to a first aspect of the present invention, there is provided a color processing method for generating color separation data corresponding to at least one basic color material and one or more particular color materials, the method including: generating color separation data corresponding to the at least one basic color material in a high lightness region of a color hue corresponding to the at least one basic color material, the high lightness region ranging from a lightness level corresponding to the maximum color saturation level that is reproducible by the at least one basic color material to the highest lightness level; and generating color separation data corresponding to the at least one basic color material and two color materials that have color hues close to that of the at least one basic color material in an intermediate lightness region whose lightness level is lower than that of the high lightness region.

According to a second aspect of the present invention, there is provided a color processing apparatus including: an input unit configured to input color data; and a converting unit configured to convert the color data into color separation data corresponding to at least one basic color material and one or more particular color materials. The converting unit is configured to generate the color separation data corresponding to the at least one basic color material in a high lightness region of a color hue corresponding to the at least one basic color material, the high lightness region ranging from a lightness level corresponding to the maximum color saturation level that is reproducible by the at least one basic color material to the highest lightness level, and generate the color separation data corresponding to the at least one basic color material and two color materials whose color hues are close to that of the at least one basic color material in an intermediate lightness region whose lightness level is lower than that of the high lightness region.

According to a third aspect of the present invention, there is provided a program for causing an image processing apparatus to perform color processing including: generating color separation data corresponding to at least one basic color material in a high lightness region of a color hue corresponding to the at least one basic color material, the high lightness region ranging from a lightness level corresponding to the maximum color saturation level that is reproducible by the at least one basic color material to the highest lightness level; and generating color separation data corresponding to the at least one basic color material and two color materials that have color hues close to that of the at least one basic color material in an intermediate lightness region whose lightness level is lower than that of the high lightness region.

According to a further aspect of the present invention, there is provided a storage medium on which a program is stored, the program for causing an image processing apparatus to perform color processing including: generating color separation data corresponding to at least one basic color material in a high lightness region of a color hue corresponding to the at least one basic color material, the high lightness region ranging from a lightness level corresponding to the maximum color saturation level that is reproducible by the at least one basic color material to the highest lightness level; and generating color separation data corresponding to the at least one basic color material and two color materials that have color hues close to that of the at least one basic color material in an intermediate lightness region whose lightness level is lower than that of the high lightness region.

Further features of the present invention will become apparent from the following description of exemplary embodiments with reference to the attached drawings.

DESCRIPTION OF THE EMBODIMENTS

Image processing according to embodiments of the present invention will now be described in detail, by way of example only, with reference to the accompanying drawings.

First Embodiment (Use of Particular Color)

First, the method of using particular colors will be described using green and blue by way of example. That is, the description about the method of setting color separation data corresponding to a green or blue recording material to a lattice point in an LUT will be given. In addition, it will be described how a color gamut is enlarged as the result of the setting.

Figure 1:
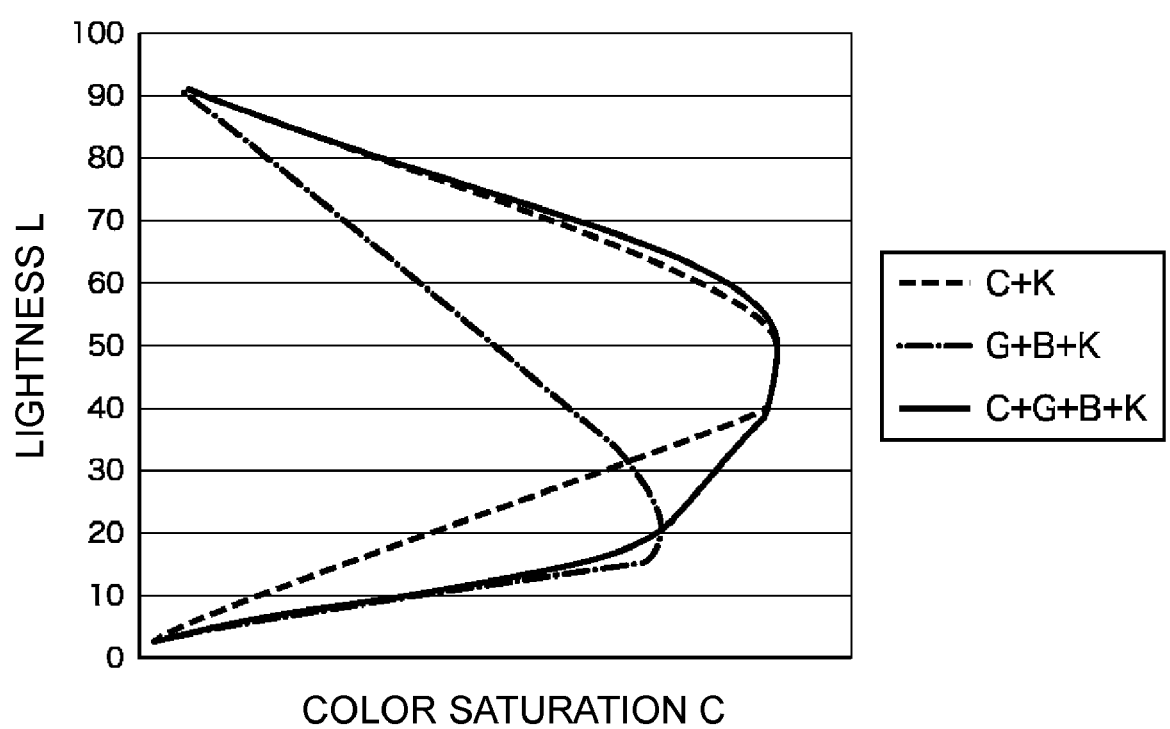
FIG. 1 is a diagram showing the color reproduction ranges of color mixtures in the LCH color system.

FIG. 1 is a diagram showing the color reproduction ranges of color mixtures in the LCH color system. Referring to FIG. 1, a dash line denotes the cyan color reproduction range of the color mixture of cyan (C) and black (K). An alternate long and short dash line denotes the cyan color reproduction range of the color mixture of green (G), blue (B), and black (K). A solid line denotes the cyan color reproduction range of the color mixture of cyan (C), green (G), blue (B), and black (K).

Figure 2:
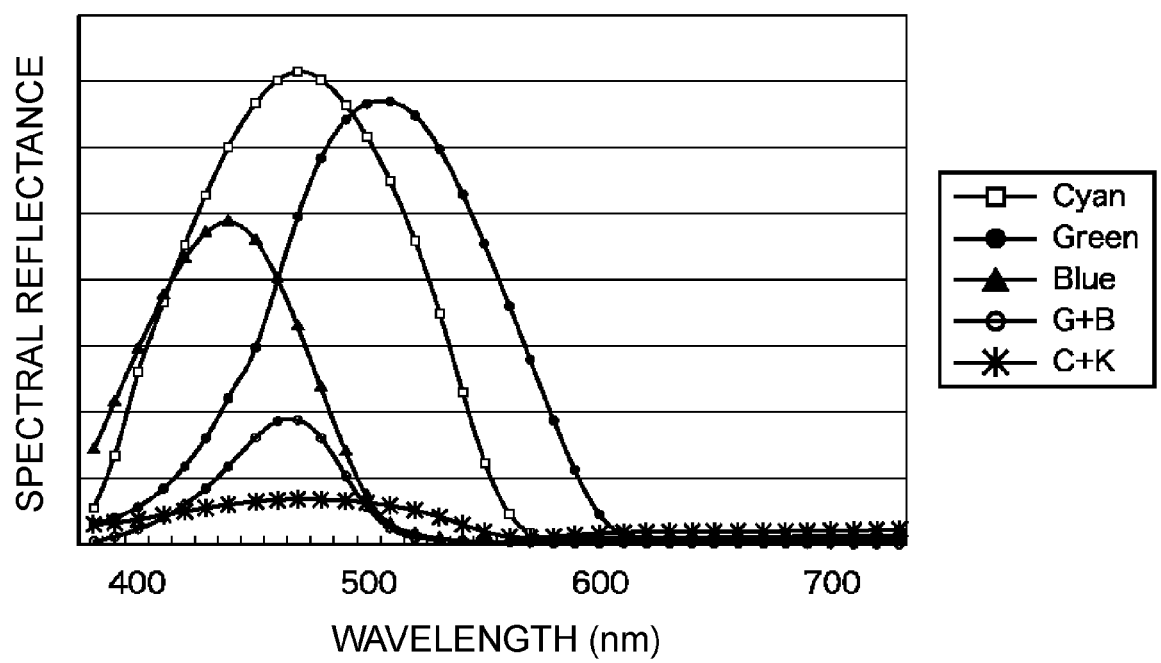
FIG. 2 is a diagram showing the spectral reflectance characteristics of images each composed of a single recording material and images each composed of a color mixture.

FIG. 2 is a diagram showing the spectral reflectance characteristics of images each composed of a single recording material and images each composed of a color mixture. As a single recording material, cyan (C), green (G), or blue (B) recording material is used, and the spectral reflectance characteristics of images each composed thereof are individually shown. As a mixture of colors, a mixture obtained by mixing green (G) and blue (B), or cyan (C) and black (K) in predetermined proportions, is used, and the spectral reflectance characteristics of images each composed thereof are individually shown.

As shown in FIG. 2, the color mixture of green (G) and blue (B) has a more sharply curved spectral reflectance characteristic than the color mixture of cyan (C) and black (K). Therefore, the color mixture of green (G) and blue (B) can reproduce a high saturation color even if in the low lightness region of a cyan hue. On the other hand, as shown in FIG. 1, in a high lightness region, higher color saturation can be obtained by using cyan (C) (the solid line and the dash line). On the other hand, in the low lightness region, higher color saturation can be obtained by using the color mixture of green (G), blue (B), and black (K) (the alternate long and short dash line). From this fact, it can be determined which combination of a basic color, particular colors, and black will be most effective for obtaining a wider color reproduction range in each lightness region.

Figure 3:
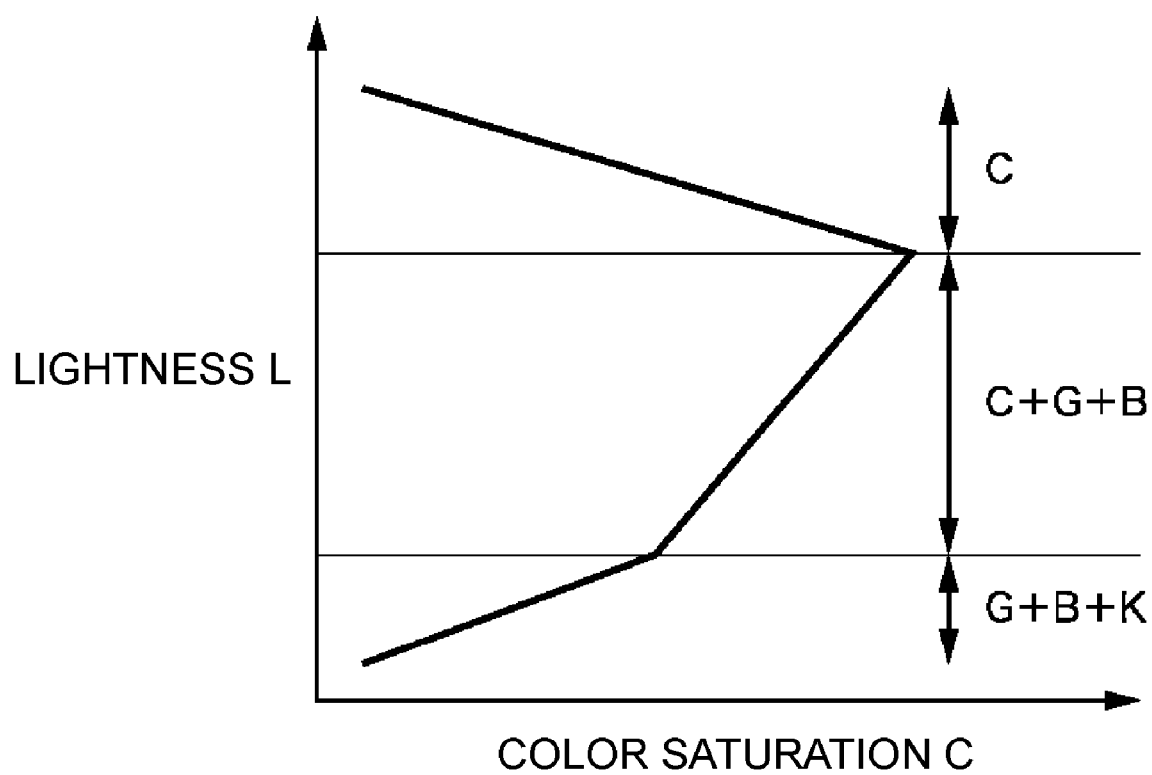
FIG. 3 is a diagram showing the various combinations of a basic color, particular colors, and black for obtaining a wider color reproduction range in individual lightness regions of a cyan hue.

FIG. 3 is a diagram showing the various combinations of a basic color, particular colors, and black for obtaining a wider color reproduction range in individual lightness regions of a cyan hue. According to the combinations shown in FIG. 3, the wider color reproduction range of a cyan hue can be obtained, and high color saturation and high image quality can also be obtained over the entire lightness region.

The subject matter of the present invention is to enlarge a color gamut by combining appropriate recording materials on a color hue-by-hue basis and a lightness region-by-region basis. That is, the combinations shown in FIG. 3 are merely illustrative. Other cases in which other recording materials not shown in FIG. 3 are used so as to enlarge a color gamut or improve other elements for image quality can be considered.

Figure 4:
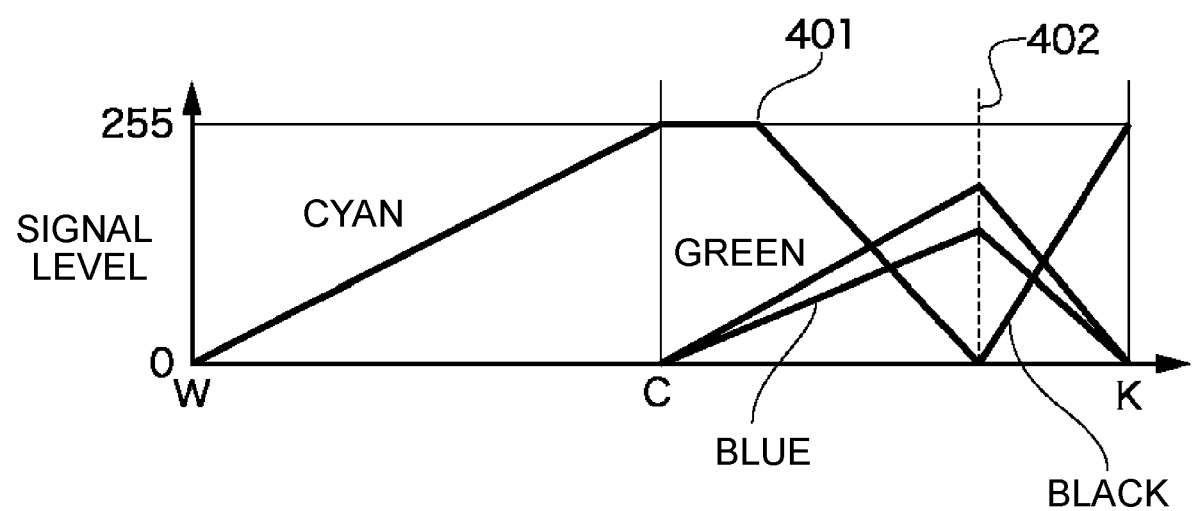
FIG. 4 is a diagram showing the amounts of cyan (C), green (G), blue (B), and black (K) recording materials used.

FIG. 4 is a diagram showing the amounts of cyan (C), green (G), blue (B), and black (K) recording materials used. The ordinate axis denotes an 8-bit signal level corresponding to the amount of a recording material used (e.g., the amount of ink applied). That is, FIG. 4 shows a part of a table for color-converting R, G, and B data into C, M, Y, K, R, G, and B data.

First, in a high lightness region ranging from white ((R, G, B)=(255, 255, 255)) to cyan ((R, G, B)=(0, 255, 255)), only a cyan recording material is used, and color reproduction is performed by varying the amount of cyan used. The high lightness region ranges from white (W) to the maximum color saturation level of the cyan recording material. Accordingly, pure cyan (C) ((R, G, B)=(0, 255, 255)) is reproduced only by using the cyan recording material (high lightness region).

Next, in a lightness region ranging from cyan (C) ((R, G, B)=(0, 255, 255)) to black (K) ((R, G, B)=(0, 0, 0)), first, lightness is reduced by adding blue (B) and green (G) recording materials that are adjacent colors of cyan (C), and then color reproduction is performed (first intermediate lightness region). Next, when the total amount of recording materials used reaches a limited level 401, the amount of cyan (C) used is reduced, and in contrast, the amount of blue (B) and green (G) used is increased (second intermediate lightness region).

When the color mixture of green (G) and blue (B) reaches the reproducible maximum color saturation level, lightness is further reduced by adding black (K) instead of cyan (C), whereby a near-black (K) color is reproduced (low lightness region).

Thus, by using two adjacent particular colors (in the above-described example, blue (B) and green (G) that are adjacent colors of cyan (C)) at the same time, a color gamut can be enlarged in the directions of the color saturation axis and the lightness axis.

In the above-described example, the method of enlarging the color gamut of a cyan hue by using green (G) and blue (B) has been described. However, this method can be similarly applied to other basic color hues and a red (R) recording material. That is, if the combination of two arbitrary particular colors can represent a color having lower lightness and higher saturation than a basic color recording material, the color gamut can be enlarged by adopting the above-described combinations of recording materials on a lightness region-by-region basis.

Similarly, in a case where one of two adjacent colors is a basic color, if the combination of the basic color and a particular color can represent a color that has lower lightness and higher saturation than a basic color recording material, a color gamut can be also enlarged by adopting the above-described combinations of recording materials on a lightness regionby-region basis. For example, in a printer not containing a blue (B) recording material, a color gamut in the low lightness region of a cyan hue can be enlarged by using the combination of green (G) and magenta (M). Likewise, in a printer not containing a green (G) recording material, a color gamut in the low lightness region of a cyan hue can be enlarged by using the combination of yellow (Y) and blue (B).

The term "particular color" used in the above description refers to color having a color hue different from that of yellow (Y), magenta (M), and cyan (C) basic color recording materials. It is desirable that lightness and color saturation representable on a recording medium by a particular color recording material are higher than those representable on a recording medium by the combination of two color materials selected from among magenta (M), yellow (Y), and cyan (C) basic color materials.

(Summary of Print System)

Figure 5:
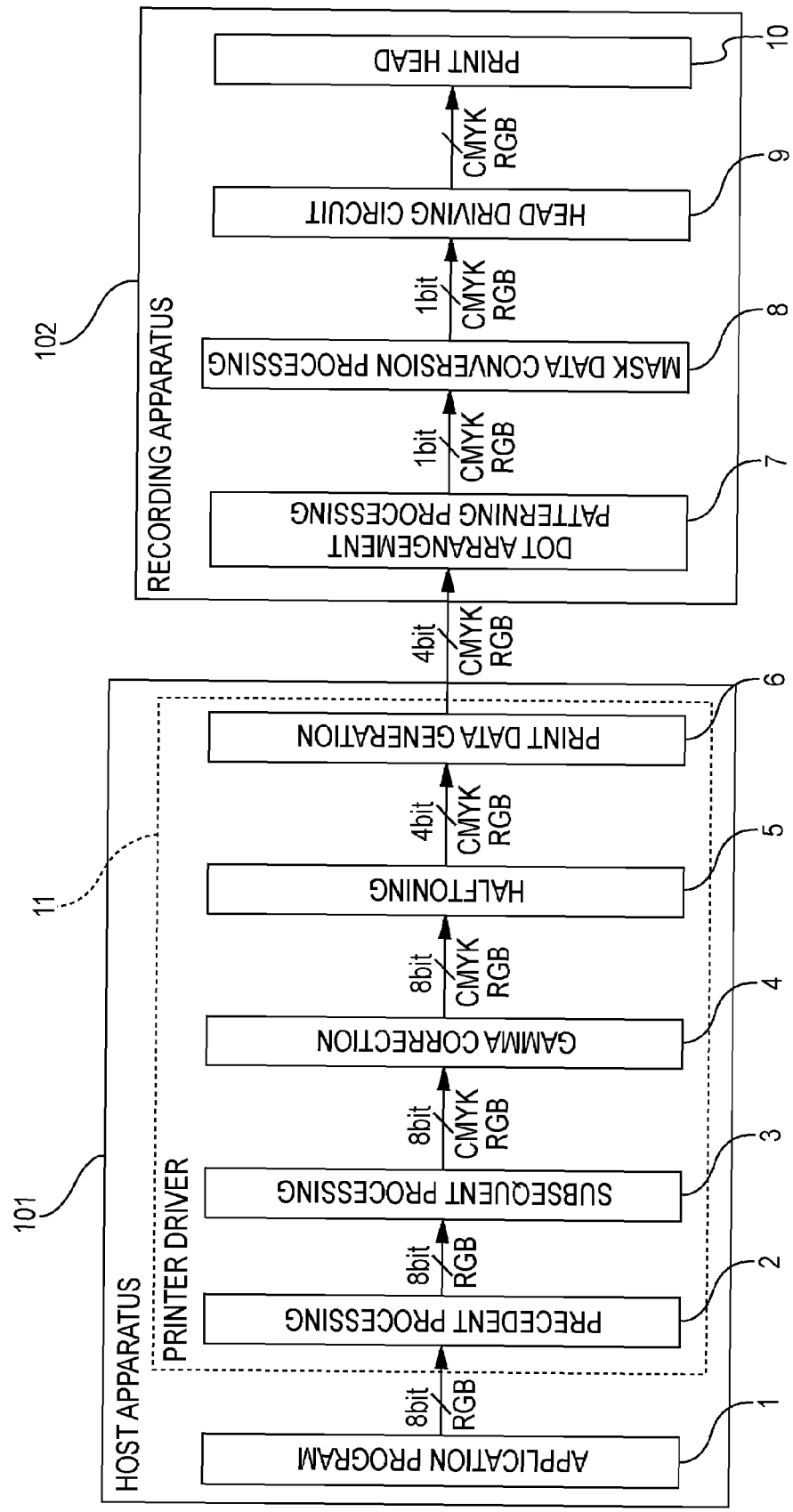
FIG. 5 is a block diagram showing an exemplary configuration of a print system according to an embodiment of the present invention.

FIG. 5 is a block diagram showing an exemplary configuration of a print system according to an embodiment of the present invention. The print system is provided with a printer 102 that uses particular colors and a host apparatus (computer or image processing apparatus) 101.

The printer (recording apparatus) 102 performs a printing operation using cyan (C), magenta (M), yellow (Y), and black (K) inks and red (R), green (G), and blue (B) particular color inks. Therefore, the printer 102 uses a print head 10 capable of ejecting these seven color inks.

An application program 1 and a printer driver 11 are operative on the operating system (OS) of the host apparatus 101. The application program 1 creates and edits image data to be printed by the printer 102.

The image data or inedited image data can be input to the host apparatus 101 via various media. For example, JPEG image data obtained by a digital camera may be input to the host apparatus 101 via a memory card. TIFF image data read by a scanner or image data stored in a CD-ROM may be input to the host apparatus 101. The image data may also be downloaded from a server disposed on a network or a website. The host apparatus 101 displays the input image data on a monitor (not shown). The user of the host apparatus 101 edits and processes the image data using the application program 1, and then inputs a print instruction. In response to the print instruction, the application program 1 (or the OS) converts the image data into, for example, image data (8 bits used for representing each color) compliant with the sRGB standard, and then transmits the converted image data to the printer driver 11.

The printer driver 11 performs color gamut mapping upon the received image data as precedent processing 2. That is, in the precedent processing 2, R, G, and B data is converted into R, G, and B data corresponding to the color gamut of the printer using a three-dimensional LUT (3DLUT) and an interpolation operation. The 3DLUT shows a relationship between a color gamut reproduced by the sRGB image data and a color gamut (printer color gamut) reproducible by the printer 102.

In subsequent processing 3, Y, M, C, K, R, G, and B color separation data (8 bits used for representing each color) corresponding to the combination of inks which allows a color indicated by the R, G, and B data having undergone the color gamut mapping to be reproduced, is obtained. Like the precedent processing 2, this subsequent processing 3 uses both the 3DLUT and an interpolation operation, and the description thereof will be given later.

In gamma correction 4, gamma correction is performed on a color-by-color basis so as to convert the tone value of the color separation data having been obtained in the subsequent processing 3. More specifically, the color separation data is converted using a one-dimensional LUT (1DLUT) corresponding to the tone characteristics of each color ink for the printer 102 so that the color separation data can be associated with the tone characteristics of the printer 102.

In halftoning 5, quantization is performed using an error diffusion scheme so as to convert the 8-bit color separation data on each color of Y, M, C, K, R, G, and B into 4-bit data. This 4-bit data is used as an index for showing a dot arrangement pattern in the printer 102.

In print data generation 6, print data including print control information and the 4-bit index data is generated.

A CPU executes the application program 1 and the printer driver 11, whereby the above-described processing thereof can be achieved. These programs are loaded from a ROM or hard disk (not shown) to a RAM and are then executed. The RAM is used as a work area by the CPU that executes these programs.

The printer 102 performs dot arrangement patterning processing 7 and mask data conversion processing 8 upon the print data having been input from the host apparatus 101.

In the dot arrangement patterning processing 7, dot arrangement is performed upon each pixel of a print image in accordance with a dot arrangement pattern corresponding to the 4-bit index data (tone value information). That is, a dot arrangement pattern corresponding to the tone value of each pixel is assigned to a corresponding pixel represented by 4-bit data. Subsequently, in accordance with the dot arrangement pattern, each of a plurality of areas in a pixel is defined as an area on which a dot is recorded or an area on which a dot is not recorded. Consequently, "1" or "0" ejection data is provided to each area.

In the mask data conversion processing 8, mask processing is performed upon the above-described 1-bit ejection data. That is, the print head 10 performs recording processing upon a scanning area (hereinafter referred to as a band) that has a predetermined width in the direction of sub-scanning, by scanning in the area a plurality of times. Ejection data required for each scanning operation is generated by the mask processing that uses a mask corresponding to the scanning operation. The Y, M, C, K, R, G, and B ejection data for each scanning operation is transmitted to a head driving circuit 9 at the right time. The head driving circuit 9 drives the print head 10 to eject each type of ink in accordance with the ejection data.

The above-described dot arrangement patterning processing and mask data conversion processing in the printer 102 are performed via a dedicated hardware circuit under the control of a CPU that configures the control unit of the printer 102. The above-described processing may be performed by the CPU of the printer 102 in accordance with a program or, for example, by the printer driver 11 in the host apparatus 101.

The printer 102 uses red (R), green (G), and blue (B) particular color inks. It is desirable that these particular color inks can individually achieve color saturation and lightness higher than those of a secondary color created by mixing two color inks selected from among yellow (Y), magenta (M), and cyan (C) basic color inks. However, the present invention is not limited to the above-described case. The particular color ink may achieve only lightness higher than that of a secondary color. That is, a particular color suitable for this embodiment can achieve lightness higher than that in a color gamut represented on a storage medium by the combination of two arbitrary recording materials selected from among magenta (M), yellow (Y), and cyan (C) basic color materials. In addition, the particular color indicates a hue angle in the color gamut. It is more desirable that the particular color can also achieve color saturation higher than that in the color gamut.

A printer using ink as a recording material has been described by way of example. However, a printer or copier using another recording material such as toner may be applied to this embodiment.

A pixel used in this embodiment denotes a minimum unit that can achieve gradation expression and is subjected to image processing for multiple-valued data, the above-described precedent and subsequent processing, gamma correction, and halftoning, etc. A single pixel used in the dot arrangement patterning processing has a pattern of 2×4 cells. Each cell included in one pixel is referred to as an area. The area is a minimum unit by which dot recording or non-recording can be defined.

Image data used in the precedent and subsequent processing and the gamma correction indicates a set of pixels to be processed. Each pixel has, for example, an 8-bit tone value. Image data used in the halftoning indicates image data itself to be processed. In the halftoning, the above-described 8-bit image data is converted into image data (index data) including a 4-bit tone value.

(Subsequent Processing)

Figure 6:
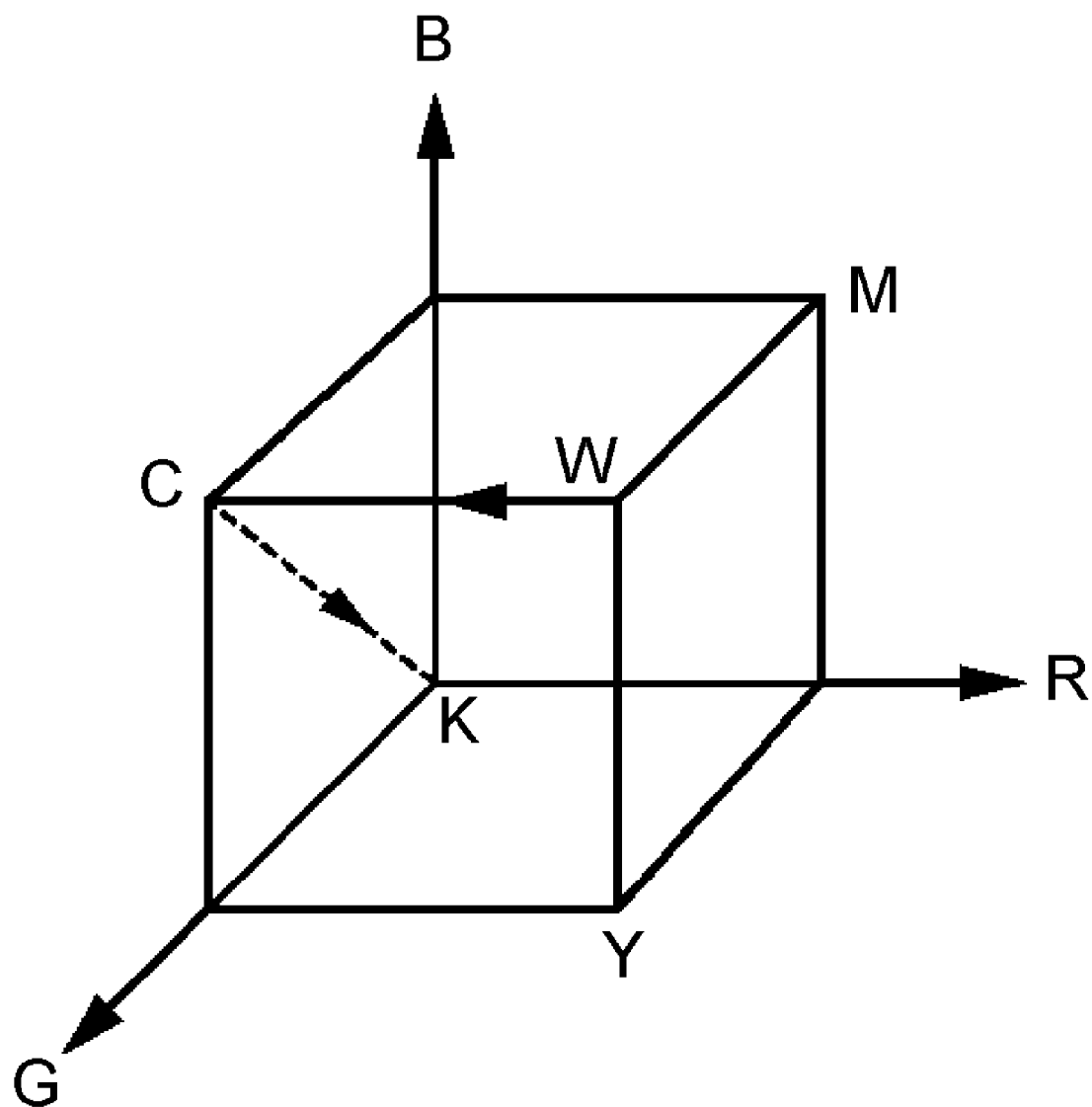
FIG. 6 is a diagram showing the concept of a 3DLUT used in subsequent processing.

FIG. 6 is a diagram showing the concept of a 3DLUT used in the subsequent processing 3.

In the subsequent processing 3, as described previously, C, M, Y, K, R, G, and B data corresponding to a lattice point for the value of R, G, and B input data is read out from a 3DLUT shown in FIG. 6 which is acquired by cutting RGB space. An interpolation operation is performed upon the C, M, Y, K, R, G, and B data having been read out, whereby the R, G, and B input data is converted into C, M, Y, K, R, G, and B color separation data.

Each lattice point in the 3DLUT stores color separation data used for achieving the characteristics shown in FIG. 4. Therefore, a desired tone value and a desired color gamut can be achieved.

For example, like the case shown in FIG. 4, the case where a cyan color hue is focused on will be described. In FIG. 6, data given by YMCKRGB=(0, 0, c, 0, 0, 0, 0), (0 ≦c≦255) is set to a lattice point that is present on a line segment from a white (W) lattice point (255, 255, 255) toward a cyan (C) lattice point (0, 255, 255) (high lightness region). In addition, data given by YMCKRGB=(0, 0, 255, 0, 0, g, b), (0≦g<255, 0≦b<255) which represents a color mixture of cyan (C), blue (B), and green (G) is firstly set to a lattice point that is present on a line segment from the cyan (C) lattice point (0, 255, 255) toward a black (K) lattice point (first intermediate lightness region).

Next, data given by YMCKRGB=(0, 0, c, 0, 0, g, b), (0≦c<255, 0<g<255, 0<b<255) is set to a lattice point that is present on a line segment from a lattice point corresponding to the limited level 401 for the total amount of ink applied, which is shown in FIG. 4, toward the black (K) lattice point (second intermediate lightness region). Next, data given by YMCKRGB=(0, 0, 0, k, 0, g, b), (0≦k ≦255, 0≦g<255, 0≦b<255) is set to a lattice point that is present on a line segment from a lattice point corresponding to the reproducible maximum color saturation level 402 for the color mixture of green (G) and blue (B), which is shown in FIG. 4, toward the black (K) lattice point (low lightness region).

In the cases of other color hues of Y, M, R, G, and B, data may be similarly set to each lattice point. Furthermore, in the case of a color hue other than the color hues of Y, M, R, G, and B which cannot be simply represented in FIG. 6, data may be similarly set to each lattice point.

That is, the conversion relationship shown in the 3DLUT corresponds to the details of the color separation data generation according to this embodiment. However, the color separation data generation may be performed without using the 3DLUT. For example, an operation may be performed upon each R, G, and B input data using an equation based on the above-described conversion relationship so as to calculate color separation data.

The host apparatus 101 performing processing shown in FIG. 5 is not limited to a computer. For example, the printer 102 may perform the processing of the host apparatus 101.

Thus, when color separation data is generated for color materials that include one or more particular color materials, the color separation data corresponding to a basic color material, and second and third color materials is generated in a low lightness region on the lower side of the maximum color saturation level of the basic color hue. The color hues of the second and third color materials are present on either side of the color hue of the basic color material and have the nearest color hue to the basic color hue, and at least one of these color materials has a particular color. Accordingly, the basic color material, the second particular color material that has an adjacent color hue of the basic color hue, and the third color material that has the other adjacent color hue are mixed and adjusted so that the color mixture of these three color materials can become the basic color hue, whereby a color having high color saturation can be reproduced in the low lightness region. That is, when the combination of these color materials is used in the low lightness region on the lower side of the maximum color saturation level of the basic color hue, a color gamut can be enlarged in the directions of the color saturation axis and the lightness axis. The adjacent colors means the colors of color materials having color hues that are present on both sides of a target color hue and have the nearest color hue to the target color hue. However, such colors that can be regarded as the same color hues as a basic color hue, for example, deep and light cyan, cannot be included in the adjacent colors.

If both the second and third color materials have particular colors, a color mixture of particular colors can be generated, whereby a color having higher color saturation can be reproduced in the low lightness region of the basic color hue.

Furthermore, if color separation data is generated for a combination including a black color material, a color gamut can be enlarged in a lower lightness region. In addition, color density decomposition using black color materials of different densities can effectively improve image quality.

If the second and third color materials are mixed in predetermined proportions and adjusted so that the color mixture of these color materials can become the basic color hue, the color mixture of the second and third color materials can represent a color point that is present on the lower lightness and higher color saturation side than a color hue representable by the color mixture of the basic color material and black and/or a complementary color in an LC plane indicating the basic color hue. That is, a user can select the combination of two adjacent color materials which can achieve higher color saturation in a lower lightness region of a basic color hue than the color mixture of basic and black color materials. Accordingly, the effect of color gamut enlargement can be increased.

In the high lightness region of the basic color hue on the upper side of the maximum color saturation level reproducible by the basic color material, color reproduction is performed using the basic color material. In the intermediate lightness region between the maximum color saturation level reproducible by the basic color material and the maximum color saturation level of the color mixture of the second and third color materials, color reproduction is performed using the color mixture of the basic, second, and third color materials. In the low lightness region, color reproduction is performed using the color mixture of the second, third, and black/complementary color materials. Thus, the combination of color materials is decided as described above by using the maximum color saturation levels of the basic color material and the color mixture of the second and third color materials as boundary levels, whereby higher color saturation can be obtained in each lightness region.

Furthermore, it is desirable that two or more color materials that are the same color hues and have different densities are prepared for at least one of the basic, second, and third color materials, and color separation data corresponding to these color materials is generated. Using the color separation data, color density decomposition can be performed upon the basic, second, or third color material, thereby further reducing granularity.

Other Embodiments

The present invention may be applied to a system including a plurality of devices (a host computer, an interface device, a reader, a printer, etc.), or an apparatus formed by a single device (a copier, a facsimile machine, etc.)

The present invention may be achieved as follows. A storage medium (recording medium) storing software capable of achieving the functions of the above-described embodiment is provided to the system or apparatus. The software is executed by the computer (CPU or MPU) of the system or apparatus, whereby the present invention can be achieved. In this case, the software read out from the storage medium achieves the functions of the above-described embodiment. Accordingly, the present invention can be applied to the storage medium storing the software.

The above-described functions achieved by executing the above-described software may also be achieved using other methods. An operating system (OS) or the like running on a computer may perform a part of or all of the processing in accordance with the instructions of the above-described software, whereby the above-described functions can be achieved.

Furthermore, the above-described software may be written in the memory of a feature expansion card or unit connected to a computer. Subsequently, the CPU of the feature expansion card or unit performs a part of or all of the processing in accordance with the instructions of the software, whereby the above-described functions can be achieved.

If the present invention is applied to the above-described storage medium, software corresponding to the above-described flowchart is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-241562 filed Aug. 23, 2005, which is hereby incorporated by reference herein in its entirety.

What is claimed is:

1. A color processing method for generating color separation data corresponding to at least one basic color material and one or more particular color materials, the color processing method comprising:

generating color separation data corresponding to the at least one basic color material in a high lightness region of a color hue corresponding to the at least one basic color material, the high lightness region ranging from a lightness level corresponding to the maximum color saturation level that is reproducible by the at least one basic color material to the highest lightness level;

generating color separation data corresponding to the at least one basic color material and two color materials that have color hues close to that of the at least one basic color material in an intermediate lightness region whose lightness level is lower than that of the high lightness region; and, generating color separation data corresponding to the two color materials and a further black color material in a low lightness region below a lightness level corresponding to the maximum color saturation level that is reproducible by a color mixture of the two color materials, the lightness level of the low lightness region being lower than that of the intermediate lightness region, wherein the generation of color separation data in the low lightness region is performed in such a manner that, with a decrease in lightness, the amount of the two color materials used is reduced, and the amount of the black color material used is increased, the generation of the color separation data in the high lightness region is performed in such a manner that, with a decrease in lightness, the amount of the at least one basic color material used is increased, and the generation of the color separation data in the intermediate lightness region is performed in such a manner that, until the amount of the at least one basic color material and the one or more particular color materials used reaches the limit of the total amount of the color materials used, with a decrease in lightness, the amount of the two color materials used is increased maintaining the amount of the at least one basic color material used at the maximum level, and after the amount of the at least one basic color material and the one or more particular color materials used reaches the limit of the total amount of the color materials used, with a decrease in lightness, the amount of the at least one basic color material used is reduced, and the amount of the two color materials used is increased.

2. A color processing method for generating color separation data corresponding to at least one basic color material and one or more particular color materials, the color process method comprising:

generating color separation data corresponding to the at least one basic color material in a high lightness region of a color hue corresponding to the at least one basic color material, the high lightness region ranging from a lightness level corresponding to the maximum color saturation level that is reproducible by the at least one basic color material to the highest lightness level;

generating color separation data corresponding to the at least one basic color material and two color materials that have color hues close to that of the at least one basic color material in an intermediate lightness region whose lightness level is lower than that of the high lightness region; and generating color separation data corresponding to the two color materials and a further black color material in a low lightness region below a lightness level corresponding to the maximum color saturation level that is reproducible by a color mixture of the two color materials, the lightness level of the low lightness region being lower than that of the intermediate lightness region, wherein the generation of the color separation data in the high lightness region is performed in such a manner that, with a decrease in lightness, the amount of the at least one basic color material used is increased, and the generation of the color separation data in the intermediate lightness region is performed in such a manner that, until the amount of the at least one basic color material and the one or more particular color materials used reaches the limit of the total amount of the color materials used, with a decrease in lightness, the amount of the two color materials used is increased maintaining the amount of the at least one basic color material used at the maximum level, and after the amount of the at least one basic color material and the one or more particular color materials used reaches the limit of the total amount of the color materials used, with a decrease in lightness, the amount of the at least one basic color material used is reduced, and the amount of the two color materials used is increased.

3. A color processing method for generating color separation data corresponding to at least one basic color material and one or more particular color materials, the color processing method comprising:

generating color separation data corresponding to the at least one basic color material in a high lightness region of a color hue corresponding to the at least one basic color material, the high lightness region ranging from a lightness level corresponding to the maximum color saturation level that is reproducible by the at least one basic color material to the highest lightness level; and generating color separation data corresponding to the at least one basic color material and two color materials that have color hues close to that of the at least one basic color material in an intermediate lightness region whose lightness level is lower than that of the high lightness region, wherein generation of the color separation data in the high lightness region is performed in such a manner that, with a decrease in lightness, the amount of the at least one basic color material used is increased, and the generation of the color separation data in the intermediate lightness region is performed in such a manner that, until the amount of the at least one basic color material and the one or more particular color materials used reaches the limit of the total amount of the color materials used, with a decrease in lightness, the amount of the two color materials used is increased maintaining the amount of the at least one basic color material used at the maximum level, and after the amount of the at least one basic color material and the one or more particular color materials used reaches the limit of the total amount of the color materials used, with a decrease in lightness, the amount of the at least one basic color material used is reduced, and the amount of the two color materials used is increased.

4. A color processing method as claimed in claim 3, wherein each of the one or more particular color materials can achieve lightness higher than that of a secondary color acquired by mixing two of the basic color materials, the color hue of the secondary color being close to that of each of the one or more particular color materials.

5. A color processing method as claimed in claim 3, wherein each of the one or more particular color materials can achieve color saturation higher than that of the secondary color.

6. A color processing apparatus comprising:

an input unit configured to input color data; and a converting unit configured to convert the color data to generate color separation data corresponding to at least one basic color material and one or more particular color materials, the color separation data corresponding to the at least one basic color material in a high lightness region of a color hue corresponding to the at least one basic color material, the high lightness region ranging from a lightness level corresponding to the maximum color saturation level that is reproducible by the at least one basic color material to the highest lightness level; and the color separation data corresponding to the at least one basic color material and two color materials that have color hues close to that of the at least one basic color material in an intermediate lightness region whose lightness level is lower than that of the high lightness region, wherein the converting unit is configured to generate the color separation data in the high lightness region in such a manner that, with a decrease in lightness, the amount of the at least one basic color material used is increased, and to generate the color separation data in the intermediate lightness region in such a manner that, until the amount of the at least one basic color material and the one or more particular color materials used reaches the limit of the total amount of the color materials used, with a decrease in lightness, the amount of the two color materials used is increased maintaining the amount of the at least one basic color material used at the maximum level, and after the amount of the at least one basic color material and the one or more particular color materials used reaches the limit of the total amount of the color materials used, with a decrease in lightness, the amount of the at least one basic color material used is reduced, and the amount of the two color materials used is increased.

7. A storage medium on which a program is stored, the program for causing an image processing apparatus to perform color processing comprising:

generating color separation data corresponding to the at least one basic color material in a high lightness region of a color hue corresponding to the at least one basic color material, the high lightness region ranging from a lightness level corresponding to the maximum color saturation level that is reproducible by the at least one basic color material to the highest lightness level; and generating color separation data corresponding to the at least one basic color material and two color materials that have color hues close to that of the at least one basic color material in an intermediate lightness region whose lightness level is lower than that of the high lightness region, wherein generation of the color separation data in the high lightness region is performed in such a manner that, with a decrease in lightness, the amount of the at least one basic color material used is increased, and the generation of the color separation data in the intermediate lightness region is performed in such a manner that, until the amount of the at least one basic color material and the one or more particular color materials used reaches the limit of the total amount of the color materials used, with a decrease in lightness, the amount of the two color materials used is increased maintaining the amount of the at least one basic color material used at the maximum level, and after the amount of the at least one basic color material and the one or more particular color materials used reaches the limit of the total amount of the color materials used, with a decrease in lightness, the amount of the at least one basic color material used is reduced, and the amount of the two color materials used is increased.

* * * * *